(12) United States Patent
Krzanowski

(10) Patent No.: US 8,325,598 B2
(45) Date of Patent: Dec. 4, 2012

(54) AUTOMATIC PROTECTION SWITCHING OF VIRTUAL CONNECTIONS

(75) Inventor: Roman Krzanowski, White Plains, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 160 days.

(21) Appl. No.: 12/469,640

(22) Filed: May 20, 2009

(65) Prior Publication Data

US 2010/0296394 A1 Nov. 25, 2010

(51) Int. Cl.
 *H04L 1/00* (2006.01)
(52) U.S. Cl. ............ 370/228; 370/242; 709/253
(58) Field of Classification Search ............ 370/219, 370/220; 709/253
See application file for complete search history.

(56) References Cited

U.S. PATENT DOCUMENTS

| | | | |
|---|---|---|---|
| 6,526,020 B1 * | 2/2003 | Ando | 370/223 |
| 7,003,705 B1 | 2/2006 | Yip et al. | |
| 7,307,948 B2 * | 12/2007 | Infante et al. | 370/225 |
| 2004/0044771 A1 | 3/2004 | Allred et al. | |
| 2004/0068535 A1 * | 4/2004 | Subbiah et al. | 709/200 |
| 2004/0133619 A1 | 7/2004 | Zelig et al. | |
| 2005/0198337 A1 * | 9/2005 | Sun et al. | 709/230 |
| 2008/0281987 A1 * | 11/2008 | Skalecki et al. | 709/253 |
| 2009/0106571 A1 | 4/2009 | Low et al. | |

OTHER PUBLICATIONS

ITU-T G.8031 (IDS).*
"Ethernet Protection Switching", ITU-T Recommendation G.8031/Y.1342, Jun. 2006, pp. 1-42.

\* cited by examiner

*Primary Examiner* — Jianye Wu
*Assistant Examiner* — Wanda Russell

(57) ABSTRACT

A method and system provision a first virtual connection between a first device and a second device; and provision a second virtual connection between the first device and a third device. A first bridge function is configured to control switching associated with the first virtual connection. A second bridge function is configured to control switching associated with the second virtual connection. A parent bridge function is configured to control switching on the first bridge function and the second bridge function, wherein the first virtual connection comprises an active connection and the second virtual connection comprises a standby connection, and wherein the parent bridge function switches traffic to the second bridge device upon determining that the first virtual connection has failed.

13 Claims, 6 Drawing Sheets

AUTOMATIC PROTECTION SWITCHING OF VIRTUAL CONNECTIONS

BACKGROUND INFORMATION

Traditional carrier networks rely on a variety of Layer 2 transport mechanisms to perform data transmission through the network. Typical transport mechanisms include asynchronous transfer mode (ATM), synchronous optical network (SONET), frame relay, etc. Increasing demands for carrier networks that support scalable infrastructures, such as mobile back haul transmission systems, Internet Protocol television (IPTV), multi-service broadband offerings (e.g., offerings of voice, video, and data), private networks, etc., have led service providers to consider alternative, more cost-effective and scalable solutions.

Carrier Ethernet networks have been developed to leverage Ethernet technology to service provider networks. Carrier Ethernet networks include Ethernet virtual connections (EVCs) established between endpoints on the network.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may facilitate automatic protection switching of Ethernet carrier network virtual connections in which a far end network device for an active connection and a far end network device for a standby (i.e., protection) connection are physically separate. In one implementation, an automatic protection switching system may include a near end network device that includes a hierarchical switching system in which a parent bridge function controls selection of a first child bridge function or a second child bridge function. In another implementation, a virtual switching function may be implemented to exchange switching and status information between the physically separate far end network devices. In such a manner, the diverse or separate far end network devices may appear as a single device to the near end network device.

Figure 1:
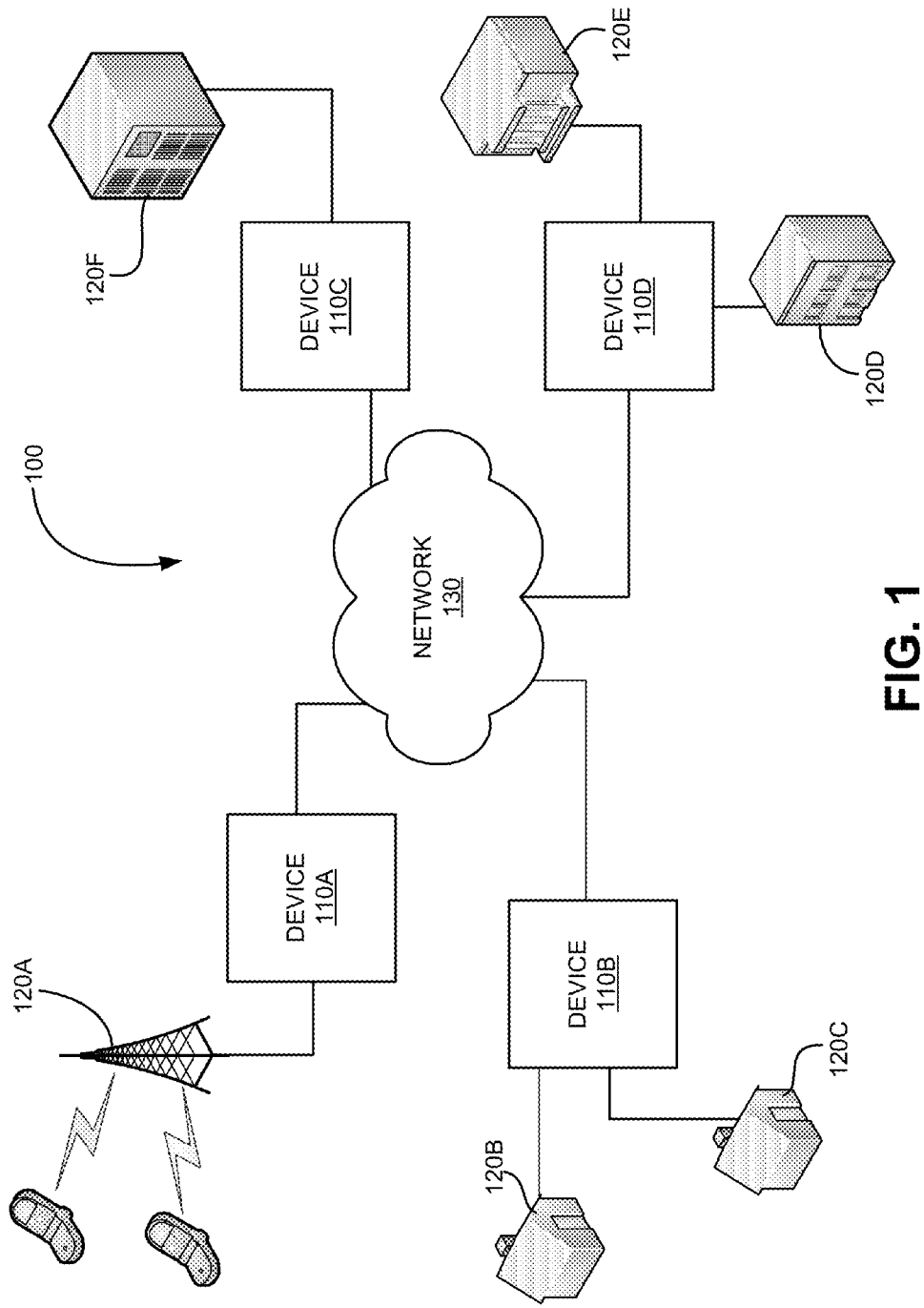
FIG. 1 depicts an exemplary network in which systems and methods described herein may be implemented.

FIG. 1 depicts an exemplary network 100 in which systems and methods described herein may be implemented. Network 100 may include network devices 110A to 110D (collectively "network devices 110" and individually "network device 110") connected to multiple end point devices 120A to 120F (collectively "end point devices 120" and individually "end point device 120") via a network 130. End point devices 120 may, in turn, be connected to customer equipment devices (not individually shown in FIG. 1). Although only four network devices 110 and six end point devices 120 have been illustrated as connected to network 130 for simplicity, in practice, there may be more or fewer connected devices. Also, in some instances, a particular network device 110 or end point device 120 may perform the functions of multiple network devices 110 and end point devices 120, respectively, or a network device 110 may perform the functions of an end point device 120 and vice versa.

Network 130 may include a carrier network, such as an Ethernet carrier network. In one implementation, network 130 may be configured as a metropolitan Ethernet network connecting physically diverse sites. Unlike traditional metro networks which may use transport mechanisms such as asynchronous transfer mode (ATM), frame relay, or synchronous optical network (SONET), in an exemplary implementation, network 130 may be configured to utilize Ethernet as its transport mechanism. As described briefly above, the use of Ethernet as a metropolitan level transport mechanisms has grown increasingly in recent years due to its relative cost and scalability with respect to alternative transport mechanisms implementations. Network 130 may also include a local area network (LAN), a wide area network (WAN), a telephone network, such as the Public Switched Telephone Network (PSTN), an intranet, an Internet Protocol-based network, such as the Internet, a session initiation protocol (SIP)-based network, a VoIP-based network, an IVR (interactive voice response)-based network, or a combination of networks. Network devices 110 may connect to network 130 via wired, wireless, and/or optical (e.g., fiber optic) connections.

Network devices 110 may include switching entities configured to support traffic across network 130. More specifically, consistent with Ethernet carrier network implementation, each network device 110 may be configured to support one or more configured Ethernet virtual connections (EVCs) thereon. An EVC may be generally considered to be a provisioned virtual connection between end point devices 120, such as between a cellular transmission facility (cell tower) (e.g., end point device 120A) and a mobile switching office (MSO) (e.g., end point device 120F (e.g., wireless Ethernet back hauling (WEBH) network). In an exemplary implementation, there may be three categories of EVCs: point-to-point (E-Line), multipoint-to-multipoint (E-LAN), and rooted-multipoint (E-Tree). E-Line services are similar to traditional TDM (time division multiplexed) leased line circuits and provide connectivity between user-to-network interfaces (UNIs). An E-LAN service is used for connecting multiple UNIs in a LAN-like fashion. The E-Tree service restricts the communication between UNIs offered by E-LAN services. E-Tree UNIs are categorized as either roots or leaves, with the basic connectivity principle being that roots can send and receive frames from other roots and all leaves, whereas leaves are limited to sending and receiving frames from roots. In some implementations, EVCs may be virtual local area networks (VLANs).

Network devices 110 may include switches, routers, hubs, bridges, etc., configured to support Ethernet carrier network functions. Although not illustrated in FIG. 1, network 130 may include multiple networks, operated by different service providers. In such an implementation, network 130 may include a number of internal network devices 110 (e.g., routers, switches, etc.) connected via network-to-network interfaces (NNIs). Each NNI in network 130 may support Ethernet carrier network functionalities and EVCs provisioned thereon.

End point devices 120 may be connected to network devices 110 via UNIs. Examples of end point devices 120 may include cellular transmission facilities, MSO's, cable television (CATV) head ends, voice telephony gateways, customer network interface devices (NIDs), etc. For example, each of end point devices 120 may represent user equipment, such as customer premises equipment (CPE), customer edge (CE) devices, switches, routers, computers or other devices coupled to network devices 110. End point devices 120 may connect to network devices 110 via wired, wireless or optical communication mechanisms. For example, end point devices 120 may connect to network devices 110 via a layer 2 network (e.g., an Ethernet network), point-to-point links, the public switched telephone network (PSTN), a wireless network, the Internet, or some other mechanism.

Figure 2:
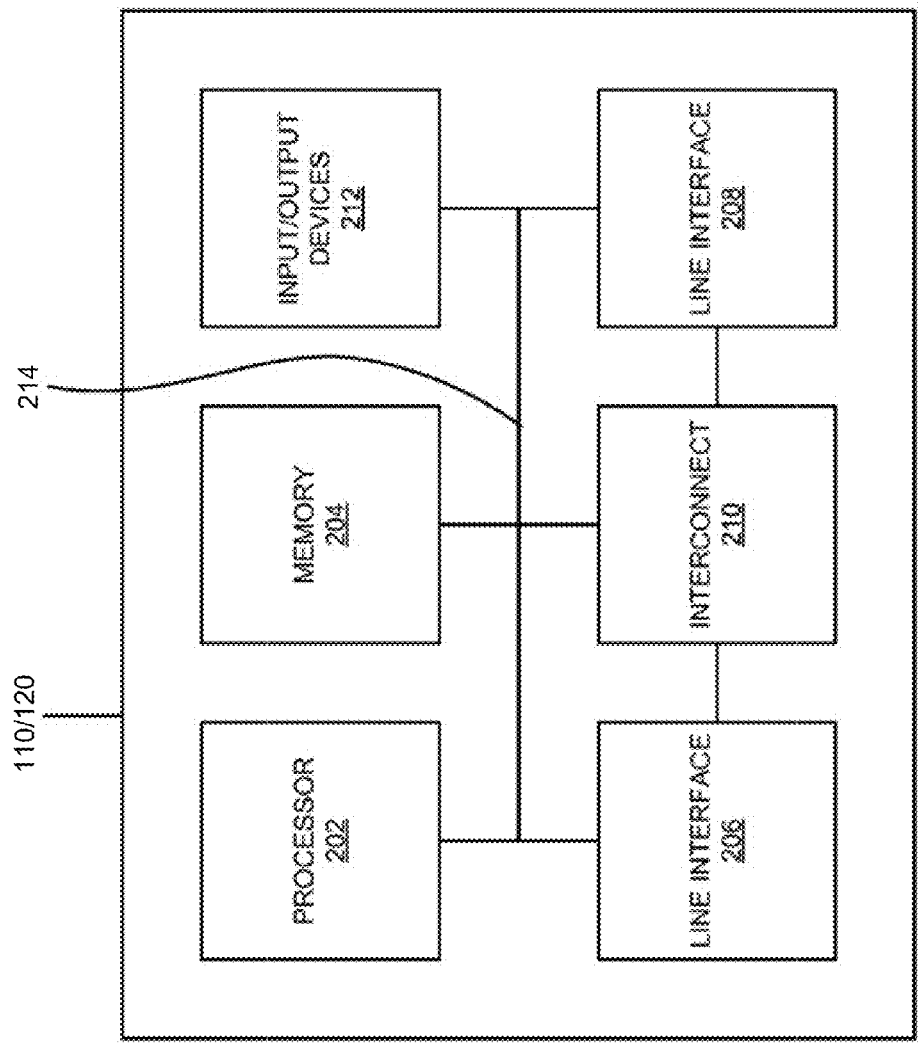
FIG. 2 depicts an exemplary network device configured to communicate via the exemplary network illustrated in FIG. 1.

FIG. 2 is an exemplary diagram of a network device 110 or end point device 120 (hereinafter called "device 110/120"), which may correspond to one or more of network device 110 and/or end point device 120. Each of devices 110/120 may include a processor 202, a memory 204, line interfaces 206 and 208, an interconnect 210, input/output devices 212, and a bus 214.

Processor 202 may include one or more processors, microprocessors, application specific integrated circuits (ASICs), field programmable gate arrays (FPGAs), and/or processing logic optimized for networking and communications. Processor 202 may process packets, frames, or and/or network path-related information. Memory 204 may include static memory, such as read only memory (ROM), dynamic memory, such as random access memory (RAM), and/or onboard cache, for storing data and machine-readable instructions. Memory 204 may also include storage devices, such as a floppy disk, a CD ROM, a CD read/write (R/W) disc, and/or flash memory, as well as other types of storage devices. Line interfaces 206 and 208 may include devices for receiving incoming data from networks and for transmitting packets to networks. Interconnect 210 may include switches or other logic for conveying an incoming packet from line interface 206 to line interface 208 based on a packet destination and stored path information. Examples of interconnect 210 may include a communication bus or a switch fabric. Input/output devices 212 may include a display console, keyboard, mouse, and/or other types of devices for converting physical events or phenomena to and/or from digital signals that pertain to devices 110/120. Input/output devices 212 may allow a user or a network administrator to interact with devices 110/120 (e.g., configure devices 110/120). Bus 214 may include a path that permits communication among components of each of devices 110/120.

As will be described in detail below, device 110/120 may support automatic protection provisioning across physically diverse end point devices. Device 110/120 may perform these operations in response to processor 202 executing software instructions contained in a computer-readable medium, such as memory 204. A computer-readable medium may be defined as a physical or logical memory device.

The software instructions may be read into memory 204 from another computer-readable medium, such as a data storage device, or from another device via line interfaces 206 and/or 208. The software instructions contained in memory 204 may cause processor 202 to perform processes that will be described later. Alternatively, hardwired circuitry may be used in place of or in combination with software instructions to implement processes described herein. Thus, implementations described herein are not limited to any specific combination of hardware circuitry and software.

Figure 3:
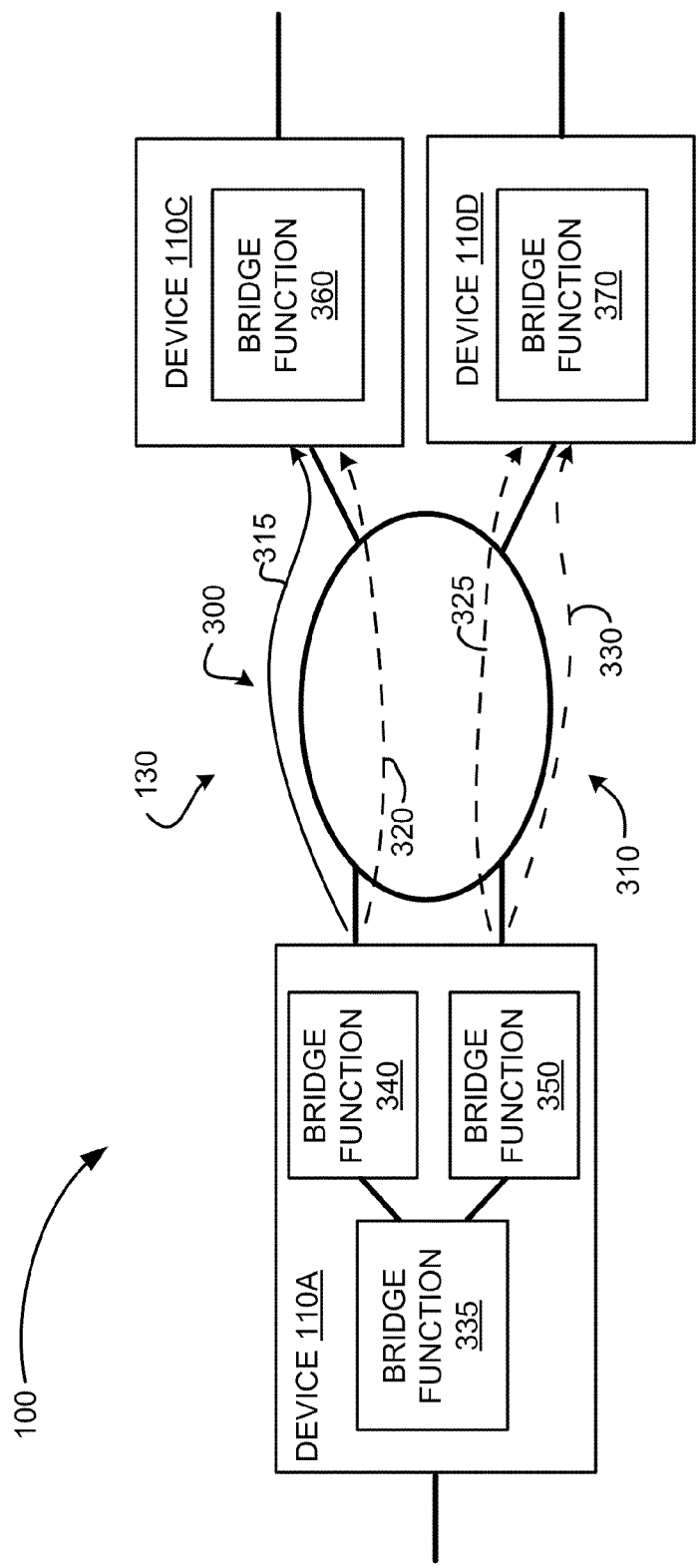
FIG. 3 is a block diagram of an exemplary portion of the network of FIG. 1.

FIG. 3 is a block diagram of a portion of network 100 in which systems and methods described herein may be implemented. As illustrated, a portion of network 100 may include near end network device 110A and far end network devices 110C and 110D connected via EVC group 300 and EVC group 310, respectively, within network 130. Implementation of carrier Ethernet networks typically requires provisioning of the EVCs through the network. This provisioning may be accomplished in a variety of manners including spanning tree protocol (STP), rapid STP (RSTP), manual provisioning, or media access control (MAC)-in-MAC provisioning. However, in STP-based networks, failure of an EVC, such as link failure or node failure, may require reconvergence of the spanning tree prior to re-provisioning of a working EVC. In large networks, this may take minutes, which may result in unacceptable levels of data loss.

As will be described in additional detail below, a virtual EVC or EVC group 300 may be provisioned between network devices 110A and 110C and a virtual EVC or EVC group 310 may be provisioned between network devices 110A and 110D to provide for link failure protection, with one of the provisioned EVC groups (e.g., EVC group 300) being the active EVC group and the other EVC group (e.g., EVC group 310) being the standby EVC group. Upon detection of a failure in the active EVC group, traffic may be immediately transitioned from the failed active EVC group to the standby EVC group.

In traditional EVC protection mechanisms, active and standby EVCs are only supported for EVCs between identical near and far end network devices, with the distinction between the active and standby EVCs being the port or ports used on the network devices and the physical paths provisioned through network 130. Unfortunately, such mechanisms do not support active and standby EVCs with physically distinct far end network devices. However, such an architecture is advantageous in that it provides protection in the event of a failure of an entire far end network device, rather than a link or node included in the active EVC.

As illustrated in FIG. 3, unlike traditional protection systems, network 100 may include active and standby virtual EVCs or EVC groups (300 and 310, respectively), rather than single provisioned EVCs. Each EVC group may include its own active and standby subEVCs. For example, EVC group 300 may include active subEVC 315 and standby subEVC 320, while EVC group 310 may include active subEVC 325 and standby subEVC 330. As illustrated, each EVC group may include a different far end network devices (e.g., network device 110C and network device 110D).

In one implementation consistent with embodiments described herein, network device 110A may support active and standby EVC groups having different far end network devices 110C and 110D by implementing a hierarchical bridging architecture to support the provisioned subEVCs (e.g., subEVCs 315-330) and treat them as a single EVC pair, in a manner substantially transparent to other devices in network 100. As illustrated, near end network device 110A may include a parent bridge function 335 and child bridge functions 340 and 350. Far end network devices 110C and 110D may include bridge functions 360 and 370, respectively. Although only two child bridge functions and two layers of switching hierarchy are shown in FIG. 3, it should be understood that any suitable number of child bridge functions and layers of hierarchy at both near end devices 110A and far end devices 110C and 110D may be used, depending on the protection requirements and the number of far end network devices being used.

Bridge functions 335-370 may include a combination of hardware and software configured to switch traffic from the active EVC, EVC group, or subEVC to the standby EVC, EVC group, or subEVC in the event of a failure. In one implementation, network devices 110 may be configured to periodically transmit and receive operation, administration and management (OAM) continuity check messages (CCMs) at a preconfigured interval. CCMs are primarily used to identify connectivity faults between network devices 110. CCMs can also detect configuration errors, such as OAM messages leaking from higher MD (maintenance domain) levels.

During initial EVC provisioning, e.g., manual provisioning, STP, etc., subEVCs 315 and 320 may be provisioned and associated with bridge functions 340 and 360. Similarly, subEVCs 325 and 330 may be provisioned and associated with bridge functions 350 and 370. As illustrated, subEVC 315 may be the active subEVC for EVC group 300 and subEVC 320 may be the standby subEVC for EVC group 300. SubEVC 325 may be the active subEVC for EVC group 310 and subEVC 330 may be the standby subEVC for EVC group 310.

To create the transparency between bridge functions 340 and 350 and other devices on network 100, parent bridge function 335 may be configured to control switching between bridge functions 340 and 350 in the event of a failure of both of subEVCs 315 and 320 in active EVC group 300. However, in the event of a failure of only active subEVC 315 (and not the entirety of EVC group 300), bridge function 340 may switch traffic to standby subEVC 320. Similarly, once EVC group 310 becomes active (e.g., because of a failure of EVC group 300), bridge function 350 may be configured to switch traffic to standby subEVC 330 in the event of a failure in active subEVC 325.

In one implementation consistent with embodiments described herein, the hierarchical bridging architecture may be leveraged to enable load balancing capabilities in addition to the automatic protection system described above. For example, incoming traffic received at parent bridge function 335 may be load balanced between active subEVC 315 and active subEVC 325. In the event of a failure in either active subEVC 315 or active subEVC 325, traffic may be switched to a respective one of subEVC 320 and/or subEVC 330 in the manner described above. Furthermore, in the event of a complete failure of virtual EVC 300 or 310, parent bridge function 335 may disable load balancing and transmit all received traffic via the active or standby subEVCs 325/330 or 315/320.

Figure 4:
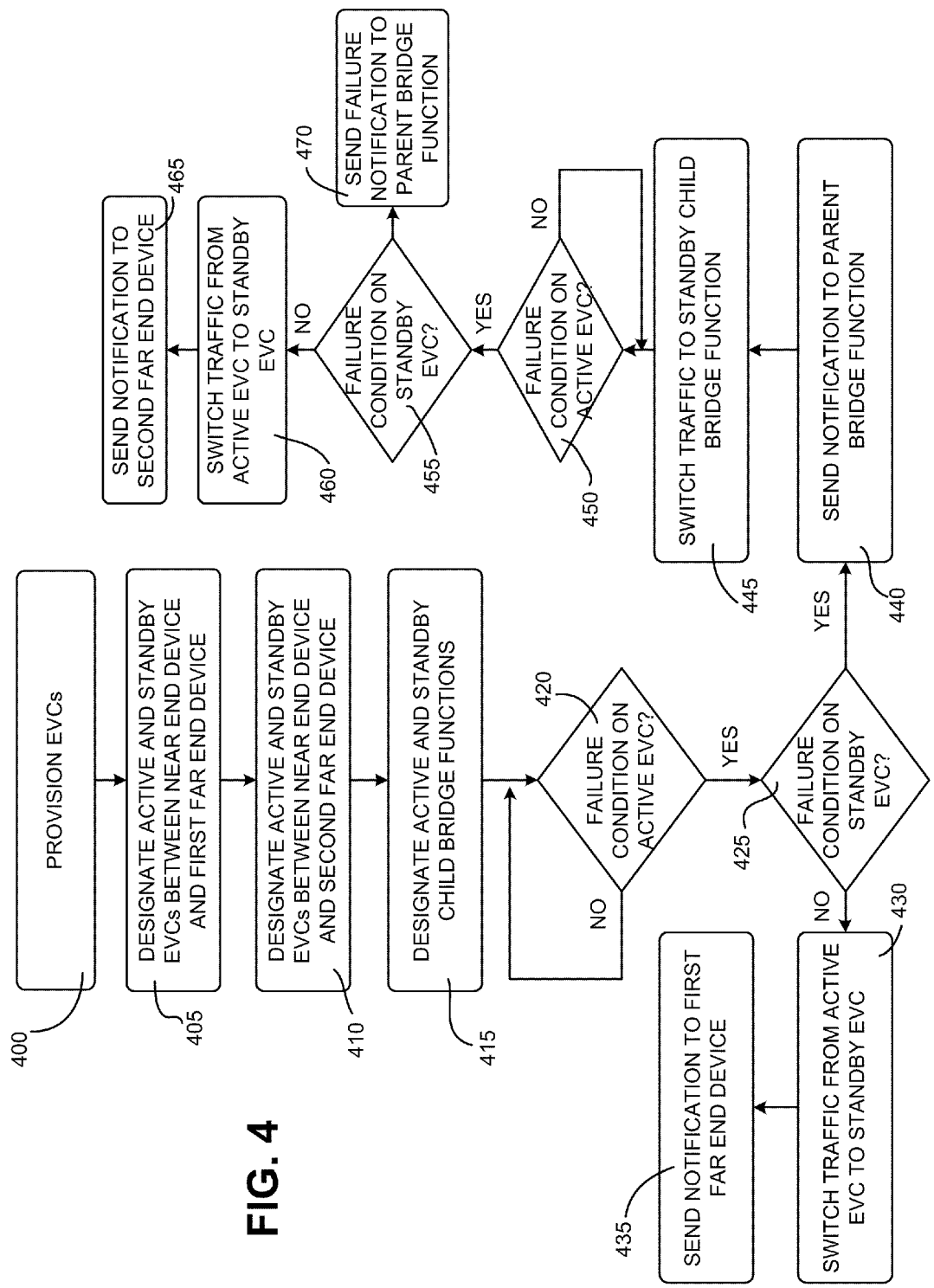
FIG. 4 is a flowchart of exemplary processes associated with the network portion of FIG. 3.

FIG. 4 is a flow diagram illustrating exemplary processing associated with providing EVC automatic protection switching in network 100. Processing may begin with the provisioning of two EVCs between a near end network device and a first far end network device and the provisioning of two EVCs between the near end network device and a second far end network device (block 400). For example, subEVCs 315 and 320 may be provisioned between near end network device 110A and far end network device 110C, and subEVCs 325 and 330 may be provisioned between near end network device 110A and far end network device 110D.

A first child bridge function running on the near end network device may be configured to designate one the provisioned EVCs between the near end network device and the first far end network device as the active EVC and the other one the provisioned EVCs between the near end network device and the first far end network device as the standby EVC (block 405). For example, child bridge function 340 may be configured to designate subEVC 315 as the active EVC and subEVC 320 as the standby EVC.

A second child bridge function running on the near end network device may be configured to designate one the provisioned EVCs between the near end network device and the second far end network device as the active EVC and the other one the provisioned EVCs between the near end network device and the second far end network device as the standby EVC (block 410). For example, child bridge device 350 may be configured to designate subEVC 325 as the active EVC and subEVC 330 as the standby EVC.

A parent bridge device may be configured to designate the first child bridge device as the active bridge device and the second bridge device as the standby bridge device (block 415). For example, parent bridge function 335 may designate child bridge function 340 as the active bridge function and child bridge function 350 as the standby bridge function. Effectively, designation of active and standby child bridge functions functionally designates EVCs associated with the child bridge functions as active and standby EVCs from the standpoint of the parent bridge device. Accordingly, from other network devices in network 100, network device 100A may be associated with an active EVC and a standby EVC.

Once all EVCs, subEVCs, and child bridge functions have been provisioned and designated as active or standby, the active child bridge function may determine whether a failure condition exists on its active subEVC (block 420). For example, in the embodiment of FIG. 3, active child bridge function 340 may determine whether a failure has been detected on active subEVC 315. As described above, failure detection may be made by, for example, exchanging CCMs between near and far end network devices 110. For example, if no CCM message is received by one of devices 110, this may indicated a failure in the other end device 110.

If no failure is detected (block 420-NO), automatic protection is not implemented and processing returns to block 420 for a next failure sampling interval. One exemplary failure sampling interval is approximately 100 milliseconds (ms), although any suitable sampling interval may be used. If a failure of the active subEVC is detected (block 420-YES), it may be determined whether a failure has also been detected on the standby subEVC (block 425). For example, bridge function 340 may determine whether a failure has been detected on standby subEVC 320.

If no failure is detected on the standby subEVC (block 425-NO), the active child bridge function may switch received Ethernet traffic from the active subEVC to the standby subEVC (block 430). For example, bridge function 340 may switch received Ethernet traffic from active subEVC 315 to standby subEVC 320. A message indicating the switch may be transmitted to the far end network device, e.g., bridge function 360 (block 435).

Automatic protection switching may operate in either a revertive or non-revertive mode of operation. In the revertive mode, switched traffic may revert back to the active EVC upon clearing of the failure condition, whereas in the non-revertive mode, switched traffic maintained on the standby EVC even following clearance of the failure condition.

If a failure of the standby subEVC is detected (block 425-YES), a notification message may be sent to the parent bridge function announcing the failure of both the active and standby subEVCs (block 440). Responsive to the notification message, the parent bridge function, e.g., parent bridge function 335, may switch traffic from the active child bridge function to the standby child bridge function (block 445). For example, parent bridge function 335 may switch traffic from bridge function 340 to bridge function 350.

The standby child bridge function may determine whether a failure condition exists on its active subEVC (block 450). For example, standby child bridge function 350 may determine whether a failure has been detected on active subEVC 325. If no failure is detected (block 450-NO), automatic protection is not implemented for the standby child bridge function and processing returns to block 450 for a next failure sampling interval. However, if a failure of the active subEVC (associated with the standby child bridge function) is detected (block 450-YES), it may be determined whether a failure has also been detected on the standby subEVC (block 455). For example, bridge function 350 may determine whether a failure has been detected on standby subEVC 330.

If no failure is detected on the standby subEVC (block 455-NO), the active child bridge function may switch received Ethernet traffic from the active subEVC to the standby subEVC (block 460). For example, bridge function 350 may switch received Ethernet traffic from active subEVC 325 to standby subEVC 330. A message indicating the switch may be transmitted to the far end network device, e.g., bridge function 370 (block 465). If a failure of the standby subEVC is detected (block 455-YES), a notification message may be sent to the parent bridge function 335 announcing the failure of both the active and standby subEVCs (block 470).

Figure 5:
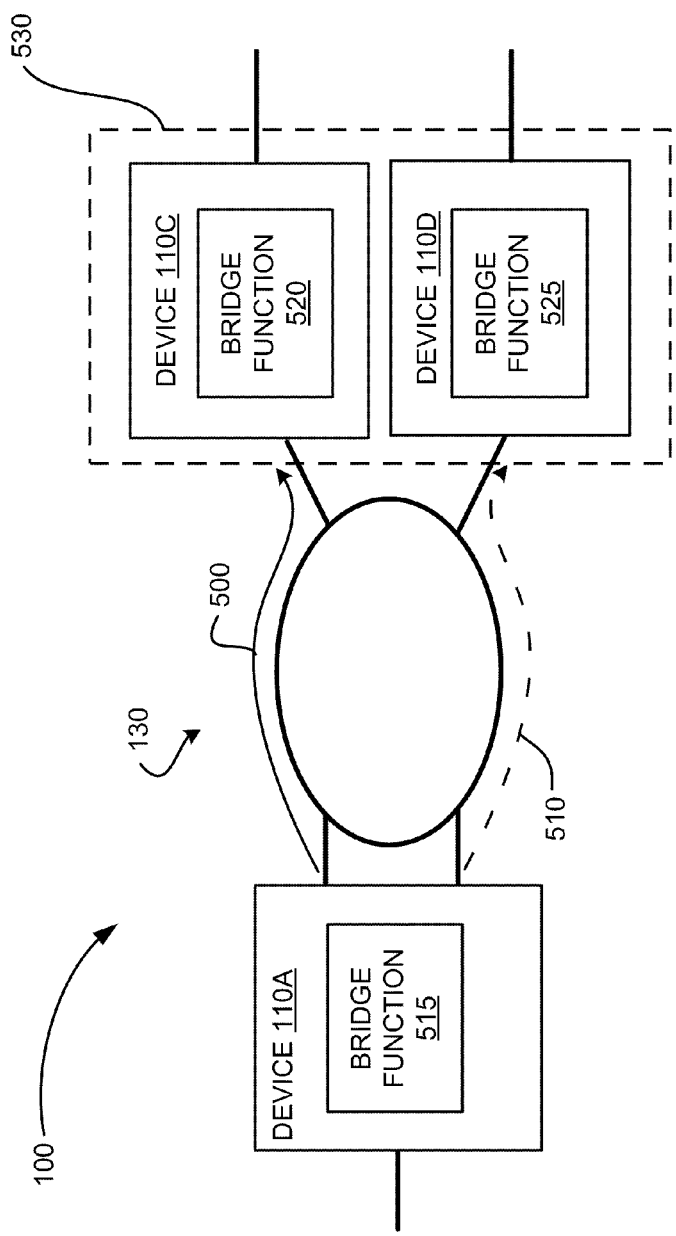
FIG. 5 is another block diagram of an exemplary portion of the network of FIG. 1.

FIG. 5 is a block diagram of a portion of network 100 in which systems and methods described herein may be implemented. As illustrated, a portion of network 100 may include near end network device 110A and far end network devices 110C and 110D connected via EVC 500 and EVC 510, respectively, within network 130. One of EVCs 500 and 510 may be provisioned as the active EVC and the other of EVCs 500 and 510 may be provisioned as the standby EVC to provide for link failure protection. Upon detection of a failure in the active EVC, traffic may be immediately transitioned from the failed active EVC to the standby EVC.

As mentioned above, traditional EVC protection mechanisms support active and standby EVCs for only EVCs connecting identical near and far end network devices. Unfortunately, such mechanisms do not support active and standby EVCs with physically distinct far end network devices, such as network devices 110C and 110D. As illustrated in FIG. 5, unlike traditional protection systems, network 100 may include active and standby virtual EVCs 500 and 510, respectively, coupled to distinct far end network devices (e.g., network device 110C and 110D).

In one implementation consistent with embodiments described herein, network device 110A may support active and standby EVC groups having different far end network devices 110C and 110D by implementing a virtual switching function across the two far end network devices, effectively treating the two far end network devices as a single device substantially transparent to other devices in network 100. As illustrated, near end network device 110A may include a bridge function 515 and far end network devices 110C and 110D may include bridge functions 520 and 525, respectively. A virtual bridge function 530 may be configured across bridge functions 520 and 525.

Bridge functions 515-525 may include a combination of hardware and software configured to switch traffic from the active EVC (e.g., EVC 500) to the standby EVC (e.g., EVC 510) in the event of a failure. Virtual bridge function 530 may be configured to facilitate the exchange of switching information between bridge function 520 and bridge function 525. In one implementation, virtual bridge function 530 may be implemented by bridge functions 520 and 525 exchanging information via an inter switch communication protocol, such as Inter-Control Center Communication Protocol (ICCP) status messages. Virtual switching function 530 may function as a virtual far end bridge function that includes both bridge function 520 and bridge function 525. As described above, link or EVC failures may be detected by monitoring OAM CCMs at preconfigured intervals.

During initial EVC provisioning, e.g., manual provisioning, STP, etc., EVCs 500 and 510 may be provisioned and associated with bridge function 515 and virtual switching function 530. To create the transparency between bridge functions 520 and 525 and other devices on network 100 (e.g., network device 110A), virtual switching function 530 may be configured to control switching between bridge functions 520 and 525 via exchanged status messages in the event of a failure in active EVC 500. To network device 110A, the active and standby EVCs appear to share a common far end device. Switching and messaging between devices may be effectively transitioned by virtual switching function 530.

Figure 6:
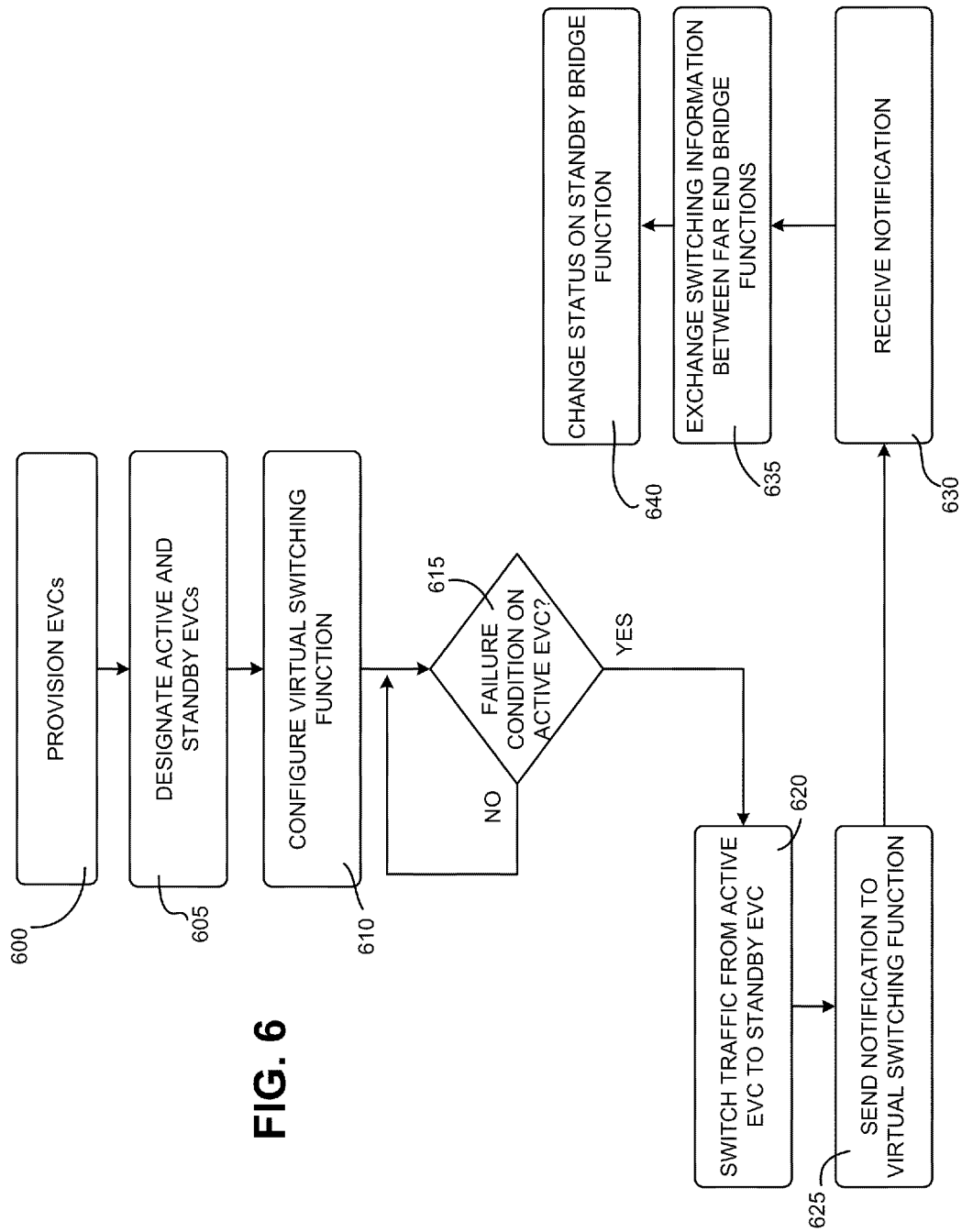
FIG. 6 is a flowchart of exemplary processes associated with the network portion of FIG. 5.

FIG. 6 is a flow diagram illustrating exemplary processing associated with providing EVC automatic protection switching in network 100. Processing may begin with the provisioning of a first EVC between a near end network device and a first far end network device and the provisioning of a second EVC between the near end network device and a second far end network device (block 600). For example, EVC 500 may be provisioned between near end network device 110A and far end network device 110C, and EVC 510 may be provisioned between near end network device 110A and far end network device 110D.

A bridge function running on the near end network device may be configured to designate one the provisioned EVCs as the active EVC and the other one the provisioned EVCs as the standby EVC (block 605). For example, bridge function 515 may be configured to designate EVC 500 as the active EVC and EVC 510 as the standby EVC.

A virtual switching function (e.g., virtual switching function 530) may be configured to act as a single far end network device for EVC 500 and EVC 510 (block 610). For example, virtual switching function 530 may be configured to exchange information between bridge functions 520 and 525 to facilitate switching between active EVC 500 and standby EVC 510 in the event of a link failure.

Once the active and standby EVCs and virtual switching function have been provisioned, the near end bridge function may determine whether a failure condition exists on its active EVC (block 615). For example, in the embodiment of FIG. 5, bridge function 515 may determine whether a failure has been detected on active EVC 500. As described above, failure detection may be made by, for example, exchanging CCMs between near and far end network devices 110.

If no failure is detected (block 615-NO), automatic protection is not implemented and processing returns to block 615 for a next failure sampling interval. One exemplary failure sampling interval is approximately 100 ms, although any suitable sampling interval may be used. If a failure of the active EVC is detected (block 615-YES), the near end bridge function may switch received Ethernet traffic from the active EVC to the standby EVC (block 620). For example, bridge function 515 may switch received Ethernet traffic from active EVC 500 to standby EVC 510. A message indicating the switch may be transmitted to the far end network device, e.g., virtual switching function 530 (block 625).

The virtual switching function 530 may receive the switch message at bridge function 520 (block 630) and may exchange the switching information with bridge function 525 (block 635). Bridge function 525 may change its status from standby to active upon receipt of the switching information from virtual switching function 530 (block 640). Bridge functions 520 may also change its state from active to standby.

By providing for automatic protection of EVCs between physically distinct far end devices, the above-described system may increase network protection against losses resulting from far end device failures.

Systems and methods described herein may enable the automatic protection switching of Ethernet carrier network virtual connections in which the far end network device for an active connection and the far end network device for a standby connection are physically separate. For example, an automatic protection switching system may include a near end network device that includes a hierarchical switching system in which a parent bridge function controls selection of a first child bridge function or a second child bridge function. Each of the first child bridge function and the second child bridge function may include active and standby connections to respective far end network devices. One of the child bridge functions (and its associated active and standby connection) is the active bridge function, while the other child bridge function is the standby bridge function.

During normal operation, network traffic received at the near end network device is switched to the active child bridge function and to the active connection associated with the active child bridge function. Upon detection of a failure on the active connection, active child bridge function may switch traffic to its standby connection. If both the active and standby connections or the entire far end device has failed, active child bridge function may notify parent bridge function, and traffic may be switched to the standby child bridge function.

Because all near end network device switching is performed via a hierarchical switching system, other devices in the network remain unaware of the separate nature of the respective far end network devices associated with the connections. The layer of protection provides increased redundancy in the event of a complete failure of a particular far end network device.

The foregoing description provides illustration and description, but is not intended to be exhaustive or to limit the embodiments to the precise form disclosed. Modifications and variations are possible in light of the above teachings or may be acquired from practice of the invention.

For example, while series of blocks have been described with regard to the flowcharts of FIGS. 4 and 6, the order of the acts may differ in other implementations. Further, non-dependent acts may be performed in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic", a "function," or a "component" that performs one or more functions. Such logic or functions may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   provisioning a first virtual connection between a first device and a second device;
   provisioning a second virtual connection between the first device and a third device,
   wherein the third device is different than the second device;
   configuring a first bridge function on the first device to control switching associated with the first virtual connection;
   configuring a first active subconnection and a first standby between the first bridge function and the second device;
   configuring a second bridge function on the first device to control switching associated with the second virtual connection;
   configuring a second active subconnection and a second standby between the second bridge function and the third device;
   configuring a parent bridge function on the first device to control switching between the first bridge function and the second bridge function,
   wherein the first virtual connection comprises an active connection and the second virtual connection comprises a standby connection;
   determining that both the first active subconnection and the first standby subconnection have failed;
   sending a notification message to the parent bridge function when both the first active subconnection and the first standby subconnection have failed; and
   switching traffic, by the parent bridge function, from the first virtual connection to the second virtual connection in response to the notification message.

2. The method of claim 1, further comprising:
   determining whether a failure condition exists for the first active subconnection;
   determining whether a failure condition exists for the first standby subconnection when a failure condition exists for the first active subconnection; and
   switching traffic, by the first bridge function, from the first active subconnection to the first standby subconnection when a failure condition does not exist for the first standby subconnection.

3. The method of claim 2, wherein determining whether a failure condition exists for the first active subconnection further comprises:
   determining whether continuity check messages (CCMs) have been received for the first active subconnection, and
   determining that the failure condition exists for the first active subconnection when CCMs have not been received for the first active subconnection.

4. The method of claim 2, further comprising:
   notifying the second device of the switch from the first active subconnection to the first standby subconnection.

5. The method of claim 1, further comprising:
   determining whether a failure condition exists for the second active subconnection; and
   switching traffic, by the second bridge function, from the second active subconnection to the second standby subconnection when a failure condition exists for the second active subconnection.

6. The method of claim 5, further comprising:
   notifying the third device of the switch from the second active subconnection to the second standby subconnection.

7. The method of claim 1, wherein the parent bridge function is configured to:

determine whether a failure condition exists on the first virtual connection or the second virtual connection; and load balance received traffic between the first virtual connection and the second virtual connection when a failure condition does not exists on the first virtual connection or the second virtual connection.

8. The method of claim 1, wherein the first virtual connection comprises a first Ethernet virtual connection group and the second virtual connection comprises a second Ethernet virtual connection group.

9. The method of claim 1, wherein the first bridge function, the second bridge function, and the parent bridge function comprise a hierarchical switching function.

10. A system, comprising:
a first network device;
a second network device coupled to the first network device via a first virtual connection; and
a third network device coupled to the first network device via a second virtual connection,
wherein the third network device is different than the second network device,
wherein the first network device comprises:
   a first child bridge function configured to control switching associated with the first virtual connection;
   a second child bridge function configured to control switching associated with the second virtual connection; and
   a parent bridge function configured to control switching associated with the first child bridge function and the second child bridge function,
wherein the first virtual connection comprises a first active subconnection between the first child bridge function and the second network device and a first standby subconnection between the first child bridge function and the second network device, and
wherein the first virtual connection comprises an active virtual connection and the second virtual connection comprises a standby virtual connection,
wherein, when the first child bridge function determines that both the first active subconnection and the first standby subconnection have failed, the first child bridge function transmits a notification message to the parent bridge function, and
wherein the parent bridge function switches traffic to the second virtual connection in response to the notification message.

11. The system of claim 10, wherein the second virtual connection, comprises:
a second active subconnection between the second child bridge function and the third network device; and
a second standby subconnection between the second child bridge function and the third network device.

12. The system of claim 11, wherein the first child bridge function is further configured to:
determine whether a failure condition exists for the first active subconnection;
determine whether a failure condition exists for the first standby subconnection when a failure condition exists for the first active subconnection; and
switch traffic from the first active subconnection to the first standby subconnection when a failure condition does not exist for the first standby subconnection.

13. The system of claim 12, wherein the first child bridge function is further configured to notify the second network device of the switch from the first active subconnection to the first standby subconnection.

* * * * *